United States Patent [19]

Peresada et al.

[11] 4,264,103
[45] Apr. 28, 1981

[54] STORABLE LEGREST ASSEMBLY

[75] Inventors: Gary L. Peresada, Watertown; Walter J. Cutler, Unionville, both of Conn.

[73] Assignee: UOP Inc., Des Plaines, Ill.

[21] Appl. No.: 39,080

[22] Filed: Apr. 30, 1979

[51] Int. Cl.³ .............................................. A47C 7/50
[52] U.S. Cl. .................................. 297/432; 297/436
[58] Field of Search .............. 297/429, 430, 432, 433, 297/435, 436, 431

[56] References Cited

U.S. PATENT DOCUMENTS

| 1,378,615 | 5/1921 | Rehanek | 297/432 |
| 1,761,602 | 6/1930 | Van Arnam | 297/435 |
| 2,174,622 | 10/1939 | Dale | 297/432 |
| 2,514,447 | 7/1950 | Hendrickson et al. | 297/436 |
| 2,664,944 | 1/1954 | Lundquist | 297/436 |
| 2,966,199 | 12/1960 | Waerner | 297/436 X |

FOREIGN PATENT DOCUMENTS 3843 of 1909 United Kingdom ..................... 297/432

Primary Examiner—Francis K. Zugel
Attorney, Agent, or Firm—James R. Hoatson, Jr.; Barry L. Clark; William H. Page, II

[57] ABSTRACT

Storable legrest assembly for a passenger seat offers support for the entire length of an occupant's legs and includes a pair of support arms which cause the padded rear support panel to be generally flush with the front portion of the seat cushion when the cushion is occupied. The arms project generally normally to the rear support panel and have pins at their lower ends which are anchored in downwardly offset portions of elongated slots formed in a pair of brackets carried by the seat frame. During storage, the pins and arms are slid to the rear ends of the slots where they are retained so that the folded legrest panels will be firmly held in a vertical position under the front end of the cushion.

7 Claims, 6 Drawing Figures

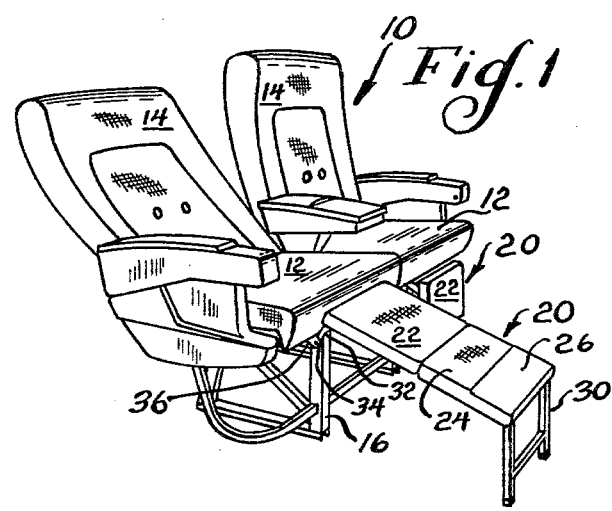
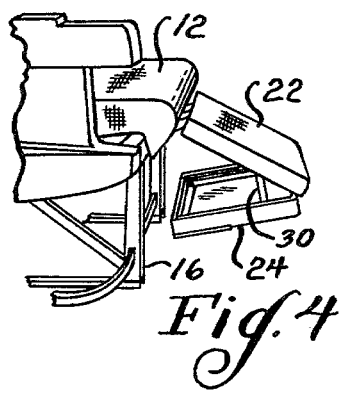
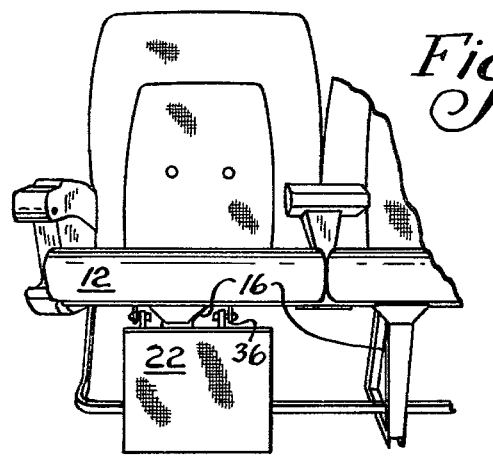
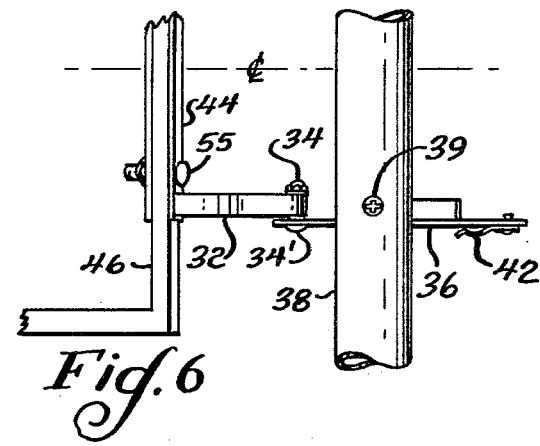
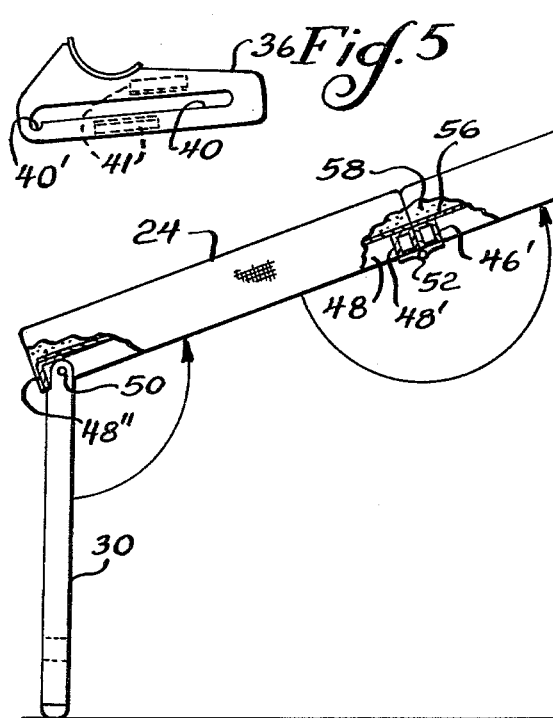
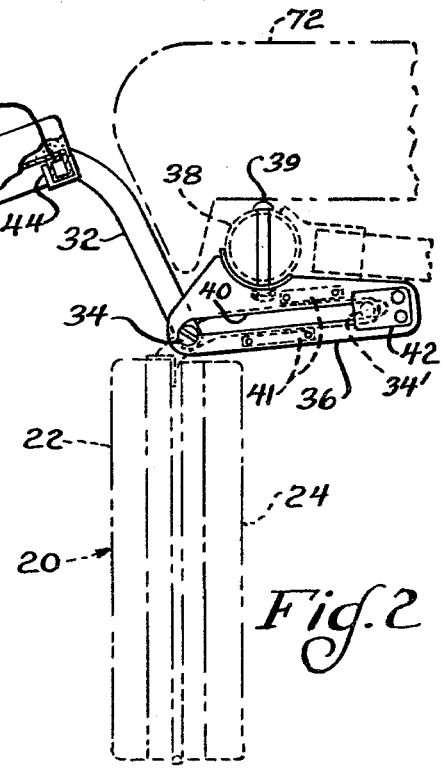

STORABLE LEGREST ASSEMBLY

BACKGROUND OF THE INVENTION

The invention relates to seating and particularly to legrests associated with passenger seats of the type found in aircraft and trains. As long range aircraft have made it possible to travel very great distances without stopping to refuel, an increased concern for passenger comfort during the journey has developed. This is particularly true in the first class cabin which is occupied principally by business executives who desire to be as rested as possible when they reach their destinations. Reclining seats and legrests are quite helpful in gaining rest. However, existing legrests of which we are aware do not seem to provide comfortable support for all portions of an occupant's legs. The short legrest disclosed in U.S. Pat. No. 4,113,311 seems to support only the upper portions of the occupant's legs while the legrests presently being utilized in certain aircraft seem to support only the lower portions of an occupant's legs. Each design, by providing support over only a limited distance causes a much greater upward reacting force to be applied to the occupant in a concentrated are of his legs than if full support were provided.

SUMMARY

It is among the objects of the present invention to provide a legrest which is of sufficient length to fully and comfortably support an occupant's legs; which is easy to store and set up; which is generally flush with the seat cushion when the seat is occupied; which is suspended above the floor when stored; and which permits easy removal of the seat cushion when desired. These and other objects are provided by the legrest assembly of the present invention which basically comprises a pair of padded panel members which have tubular frames which are hinged together so that the forward panel may be folded under the rearward one. A generally U-shaped forward leg member is pivoted to the front frame portion of the forward panel and is of a length such that it can be folded for storage within the confines of the frame of the forward panel before that panel is folded under the rear panel. A pair of arms are affixed to the rear frame portion of the rear panel. The arms have pins at their lower ends which engage an offset portion at the front end of a generally horizontal slot in a pair of support brackets fastened to the seat frame under the front edge of the cushion. The arms lock in the offset portions when the legrest is in use. In such position they extend generally vertically and slightly forwardly so as to clear the front lip of the cushion which overhangs the seat frame and to support the rear padded panel generally flush with the top surface of the cushion when the cushion is depressed by a seated occupant. When the legrest is to be stored, the panels are folded against each other after the front leg member is folded and then the arms are lifted out of the offset portions and are slid under the cushion along the slots in the brackets after the panels are pivoted down to their vertical storage position. When the arms are pushed all the way in, enlarged heads on their pivot pins engage resilient detent members to lock the legrest in its storage position.

BRIEF DESCRIPTION OF THE DRAWINGS

FIG. 1 is a perspective view of a two passenger seating unit showing the legrest assembly in both its use mode and its storage mode.

FIG. 2 is a partially broken away side view showing the legrest assembly in its use position in solid lines and in its storage position in dotted lines;

FIG. 3 is a front perspective view showing the relationship between a seat and a stored legrest assembly;

FIG. 4 is a fragmentary perspective view showing the legrest as it appears while being folded or unfolded;

FIG. 5 is a side view of the slotted bracket; and

FIG. 6 is a fragmentary top view showing the relationship between the support arm, bracket and panel frame.

DESCRIPTION OF THE PREFERRED EMBODIMENT

In FIG. 1, a two passenger seating unit indicated generally at 10 includes seat cushion portions 12 and seat back portions 14. As is customary, the seat backs 14 can be tilted to varying positions of recline as desired by the occupant and two of such positions are illustrated. A leg and frame structure 16 serves to anchor the seat to the floor. A legrest assembly indicated generally at 20 is shown as being attached to each seat with the left unit being in its open or use position and the other unit being in its folded or storage position. The legrest assembly 20 includes a rear padded panel portion 22 and a front padded panel portion 24. The panels are preferably covered with the same upholstery material used for the seat cushion except for a portion 26 at the forward end of panel 24 which is covered with plastic or other material which can be readily cleaned when soiled by an occupant's shoes. The front edge of the front panel portion 24 is supported above the floor by a folding leg assembly 30. The rear panel portion 22 is supported from a horizontal, tubular frame portion of the seat by a pair of arm members 32 which have transverse pins 34 at their lower ends. The pins 34 are supported for generally horizontal movement in slots formed in brackets 36 in a manner which will be hereinafter described.

In FIG. 2 the legrest assembly 20 is shown in solid lines in its use position relative to a seat cushion 12. It is also shown in dotted lines in its folded storage position. The arm members depend downwardly and rearwardly so that the panel 22 can be quite close to the forward edge of seat cushion 12. They have a length sufficient to cause the plane of the top surface of panels 22, 24 to be close to or slightly below the top front edge of the cushion 12 when the seat cushion is depressed by an occupant. A tubular horizontal member 38, which forms a portion of the seat frame 16, underlies and supports the forward portion of the cushion member 12. The aforementioned pair of bracket members 36 are attached to the tubular member 38 by bolts 39. The brackets 36 each include an elongated, generally horizontal slot 40 which guides and anchors the pin 34 carried by the lower end of one of the arms 32. As seen more clearly in FIG. 5, the forward end of the slot 40 includes a slightly downwardly offset portion 40' which serves as a detent which firmly retains the pin 34 against horizontal movement when the arm 32 is in its upward use position. When the legrest assembly is to be folded for storage as indicated in FIG. 4, and moved to the dotted line storage position of FIG. 2, the arms 32 are slightly raised to lift the pins 34 out of the detents 40' and the pins 34 are then slid rearwardly along the slot 40 and between the guide members 41 until they achieve the generally horizontal position shown in dotted lines in FIG. 2. In such position, an enlarged head 34' on the pin 34 is engaged and retained by a spring detent plate 42. The arm members 32 are preferably welded to a U-shaped channel member 44 which is attached to the rear square tubular frame member 46 of the panel member 22. The attachment is preferably accomplished by threaded fastener members 55 (FIG. 6). By making the channel member 44 of less length than the rear frame portion 46, it is possible to provide for a degree of sidewise adjustment of the legrest assembly relative to the arms 32. Thus, the legrest assembly 20 can be centered relative to the seat cushion 12 even though the location of a seat leg 16 on a particular seat and its point of attachment to tubular frame 38 requires that the bracket members 36 be mounted unsymmetrically relative to the center line of the seat cushion 12.

The square tubular frame portion 46 surrounds the interior perimeter of the panel member 22 and includes a front portion 46' which is hingedly positioned in contact with a rear portion 48' of a front panel frame structure 48. The front frame structure 48 is also of square tubular shape except for the front end portion 48" which is an angle member which facilitates the mounting of the legs 30 by means of bolts 50. The lower edge of the front portion of angle member 48" also acts as a stop to limit the forward movement of legs 30 so that they depend downwardly from the panel 24 and forwardly of a plane normal to the plane of panel 24 which passes through the axes of bolts 50. The frame portions 46', 48' are firmly connected to each other by an elongated piano hinge member 52. The hinge member 52 and the intimate contact of the square frame portions 46', 48' with each other is sufficient to resist downward loads which might be expected to be applied to the panels 22', 24. The interior of the rear panel member 22 comprises a pan portion 56, preferably of aluminum, which is attached to the frame 46 and forms a base for foam or other padding material 58 which is positioned above it and under an appropriate layer of upholstery material. A thickness of 1.0" for the cushion 58 has been found to provide good comfort while a square steel tube having a 0.625×0.625" outer dimension and a 0.035" wall has been found to provide adequate support.

We claim as our invention:

1. A storable legrest assembly for a passenger seat comprising a pair of mounting brackets affixed to a horizontal frame portion of the seat which underlies a seat bottom cushion, said brackets each including a short, generally straight fore and aft extending slot portion which is positioned immediately under said frame portion and on the fore and aft sides thereof; a pair of short support arms; each of said arms having a straight portion and a pin means at one end thereof which is engaged in the slot portion in one of said brackets; said pair of support arms being affixed to a U-shaped channel member which is adapted to underlie the rear frame portion of a first padded legrest panel member, said channel member being affixed to said rear frame portion by fasteners, said channel member being of less length than said rear frame portion to permit the sideways positioning of the assembly relative to a seat cushion to be varied; the front frame portion of said first panel member being hinged by an elongated hinge member to the rear frame portion of a second padded legrest panel member so that the second panel member can be folded for storage when desired under the first panel member with the respective frame portions abutting each other, said frame portions which are hinged together cooperating with each other and with said hinge member to maintain said panel members in a generally flat plane when downward loads are applied during use to either or both of said panel members; leg means pivotally attached to the front frame portion of the second panel member, said leg means being manually movable between a generally vertical use position and a folded storage position adjacent the back side of said second panel member and within the confines of the frame portion thereof, said leg means and said pair of support arms being adapted to absorb all the loading on said legrest; and means on said brackets for locking the pin means on said arms at the forward end of said slot portions when said legrest assembly is in its use position with the straight portions of said arms generally vertical and for locking said pin means at the rearward end of said slot portions when said legrest assembly is in its storage position wherein the straight portions of said arms are generally horizontal and in parallel, adjacent relation to said slot portions and said panel members are folded back to back and suspended vertically under the front edge of said seat bottom cushion.

2. The legrest assembly of claim 1 wherein said means on said brackets for locking said pin means at the forward end of said slot portions comprises a downwardly extending offset or recess in said slot which is of a width and depth sufficient to prevent fore and aft movement of said pin means when said pin means is seated therein.

3. The legrest assembly of claim 1 wherein said means on said brackets for locking said pin means at the rearward end of said slot portions comprises a spring biased detent member which overlies a headed portion of said pin means when said legrest assembly is in its storage position.

4. The legrest assembly of claim 1 wherein said support arms are affixed to said first panel in such a way that they extend downwardly and sightly rearwardly when said legrest assembly is in its use position, said leg means being attached to said second panel member so that they extend downwardly and forwardly of a plane which is normal to the plane of the second panel member and which passes through the points at which the leg means are attached thereto.

5. The legrest assembly of claim 4 wherein said support arms are of a length sufficient to position the first panel member at a use location closely adjacent the front edge of the seat bottom cushion and sufficiently below its top surface when unoccupied that the plane of the top surface of the panel will be close to or slightly below the top front edge of the cushion when it is depressed by an occupant.

6. The legrest assembly of claim 1 wherein at least one guide member is positioned on each of said brackets under the lower edge of said fore and aft extending slot portion, each of said guide members serving to guide and support the weight of the straight portions of said arms as they are moved from their use to their storage position.

7. The legrest assembly of claim 6 wherein a second guide member is positioned on each of said brackets so as to restrain said arms against upward movement.

* * * * *